United States Patent
Kikuchi

[11] Patent Number: 6,123,846
[45] Date of Patent: Sep. 26, 2000

[54] ACTIVATED-SLUDGE PROCESSING APPARATUS AND METHOD FOR CONTROL OF SLUDGE TO BE RETURNED

[75] Inventor: Shu Kikuchi, Tokyo, Japan

[73] Assignee: NEC Corporation, Tokyo, Japan

[21] Appl. No.: 09/247,565

[22] Filed: Feb. 10, 1999

[30] Foreign Application Priority Data

Feb. 16, 1998 [JP] Japan .................................. 10-032853

[51] Int. Cl.[7] ....................................................... C02F 3/12
[52] U.S. Cl. .......................... 210/614; 210/626; 210/143; 210/195.3
[58] Field of Search ..................... 210/614, 620, 210/623, 626, 143, 195.3

[56] References Cited

U.S. PATENT DOCUMENTS

| | | | |
|---|---|---|---|
| 3,684,702 | 8/1972 | Hartmann | 210/614 |
| 4,783,750 | 11/1988 | Smith | 210/626 |
| 5,106,511 | 4/1992 | Kodukula | 210/614 |
| 5,585,001 | 12/1996 | Jang et al. | 210/614 |
| 5,702,951 | 12/1997 | Bridger | 210/620 |

FOREIGN PATENT DOCUMENTS

| | | |
|---|---|---|
| 3442013 | 5/1986 | Germany . |
| 52-46669 | 4/1977 | Japan . |
| 54-44596 | 4/1979 | Japan . |
| 54-127154 | 10/1979 | Japan . |
| 9-229923 | 9/1997 | Japan . |

*Primary Examiner*—Christopher Upton
*Attorney, Agent, or Firm*—Foley & Lardner

[57] ABSTRACT

A part of effluent is taken out, saturated with oxygen in a dissolved oxygen-saturation tank 5, and transferred into a dissolved oxygen measurement tank 6. Also, a part of the activated sludge in an aeration tank 1 is extracted and transferred into the measurement tank 6 via a distribution tank 4, and the change of dissolved oxygen concentration in the measurement tank 6 is measured. Based on the result of measurement is determined an organic matter concentration in effluent, and an amount of activated sludge to be returned from a precipitation tank 2 to the aeration tank 1 is determined based on the organic matter concentration. Thus, the fluctuation of organic matter load in effluent can be monitored simply and the amount of activated sludge to be returned can be controlled to match the fluctuation. There are provided a method for enabling such an operation and an apparatus suitably used in the method.

15 Claims, 5 Drawing Sheets

ACTIVATED-SLUDGE PROCESSING APPARATUS AND METHOD FOR CONTROL OF SLUDGE TO BE RETURNED

BACKGROUND OF THE INVENTION

1. Field of the Invention

The present invention relates to a method for controlling, in the processing of effluent with activated sludge, the amount of activated sludge to be returned from a precipitation tank to an aeration tank, in particular, a method for returning activated sludge of an amount matching the determined fluctuation of the organic material concentration in effluent. The present invention relates also to an activated-sludge processing apparatus suitably used in conducting the above method.

2. Description of the Related Art

Processing of effluent with activated sludge is based on a principle that the organic material in effluent is decomposed in an aeration tank by the microorganisms in activated sludge. Therefore, when the amount of organic matter flowing into the aeration tank is larger than the decomposability possessed by the microorganisms in activated sludge, the decomposition of the organic matter is incomplete and the effluent is discharged in a state of incomplete processing. Therefore, in designing an apparatus for effluent processing with activated sludge, it has heretofore been customary to allow an effluent-controlling tank to have a large size in order to make substantially constant the effluent load. Further, the amount of activated sludge to be returned to the aeration tank in order to maintain the sludge amount therein at a required level has been fixed depending upon the design conditions used; and, in many cases, the amount has not been varied so as to match the fluctuation of the organic matter load in effluent.

Meanwhile, JP-A-9-229923 discloses an apparatus for measuring the pollutant load in effluent by the use of a biosensor, used in processing of sewage or effluent. According to the literature, effluent is passed through a pre-processing part, i.e. a suspended matter-removing unit using a hollow fiber membrane module to remove the suspended matter in effluent (the suspended matter may clog the effluent pipe) to send the effluent stably to a biosensor; then, the suspended matter-removed effluent is introduced into a measurement unit such as a harmful matter measurement section, an organic matter load measurement section or a nitrification group load measurement section (either of these sections has a biosensor) to examine the loads of pollutant (organic matter and nitrification group) to the microorganisms in activated sludge, their proportions, and the adverse effect of harmful matter on the microorganisms in activated sludge; thereby, the effective control of sewage or effluent processing is made possible.

In the above conventional technique, a different sensor is required for each matter to be measured; further, a pretreatment (e.g. removal of suspended matter) is necessary; furthermore, the organic matter, etc. adhering to or contained in the suspended matter are not measured; therefore, the measurement of true organic matter load in effluent is impossible.

SUMMARY OF THE INVENTION

The present invention is intended to provide (1) a method for controlling the amount of activated sludge to be returned from a precipitation tank to an aeration tank so that the sludge amount in the aeration tank can match the fluctuation of the organic matter load in effluent, by monitoring the organic matter load in effluent by a simple means, and (2) an apparatus suitably used for conducting the method.

In the present invention, the amount of activated sludge to be returned from a precipitation tank to an aeration tank is controlled so that the amount of activated sludge in the aeration tank can match the organic matter load in effluent, whereby the effluent can be processed stably even when the organic matter load in effluent fluctuates.

In the present invention, the organic matter load in effluent is monitored because the rate of oxygen consumption by activated sludge differs by the concentration of to-be-processed organic matter in effluent, and activated sludge is returned from a precipitation tank to an aeration tank in an amount matching the organic matter load in effluent; thereby, the processing of effluent can be conducted stably.

The present invention lies in a method for controlling, in an activated-sludge processing apparatus comprising at least an aeration tank and a precipitation tank, the amount of the activated sludge to be returned from the precipitation tank to the aeration tank, which method comprises:

a step of extracting a part of effluent to be processed in the aeration tank and aerating the extracted effluent to saturate it with oxygen to prepare a dissolved oxygen-saturated effluent, a step of extracting a part of activated sludge present in the aeration tank and mixing the extracted activated sludge with the dissolved oxygen-saturated effluent to prepare a mixture, a step of measuring the change of the dissolved oxygen concentration in the mixture, a step of determining, from the change, the dissolved oxygen consumption pattern or rate of the activated sludge instantly present in aeration tank, comparing the pattern or rate with the predetermined dissolved oxygen consumption pattern of a standard sludge at various organic matter concentrations to determine an organic matter concentration in the effluent to be processed, and determining, based on the organic matter concentration, an amount of activated sludge to be returned, and a step of returning, based on the amount, part of the activated sludge in the precipitation tank to the aeration tank.

The present invention also lies in an activated-sludge processing apparatus comprising:

an aeration tank, a precipitation tank, a means for extracting a part of effluent to be processed in the aeration tank and aerating the extracted effluent to saturate it with oxygen to prepare a dissolved oxygen-saturated effluent, a means for extracting a part of the activated sludge present in the aeration tank, a means for mixing the extracted activated sludge with the dissolved oxygen-saturated effluent to prepare a mixture, a means for measuring the change of the dissolved oxygen concentration in the mixture, a means for determining, from the change, the dissolved oxygen consumption pattern of the mixture, comparing the pattern with the predetermined dissolved oxygen consumption pattern of a standard sludge at various organic matter concentrations to determine an organic matter concentration of the effluent to be processed, and determining, based on the organic matter concentration, an amount of activated sludge to be returned, and a means for returning, based on the amount, part of the activated sludge in the precipitation tank to the aeration tank.

The first merit of the present invention is that effluent can be processed stably even when the concentration of organic matter in effluent fluctuates. The reason is that by employing the present invention, the amount of activated sludge returned is controlled so that the concentration of activated sludge in aeration tank can be maintained at a level optimum for treatment of the organic matter in effluent.

The second merit of the present invention is that the effluent processing apparatus used can be made small. The reason is that since the amount of activated sludge to be returned from a precipitation tank to an aeration tank can be controlled so that the concentration of activated sludge in the aeration tank is maintained at an optimum level, it is not necessary to design the effluent-controlling tank and the aeration tank so as to meet the anticipated maximum load of organic matter in effluent.

DETAILED DESCRIPTION OF THE PREFERRED EMBODIMENTS

Figure 1:
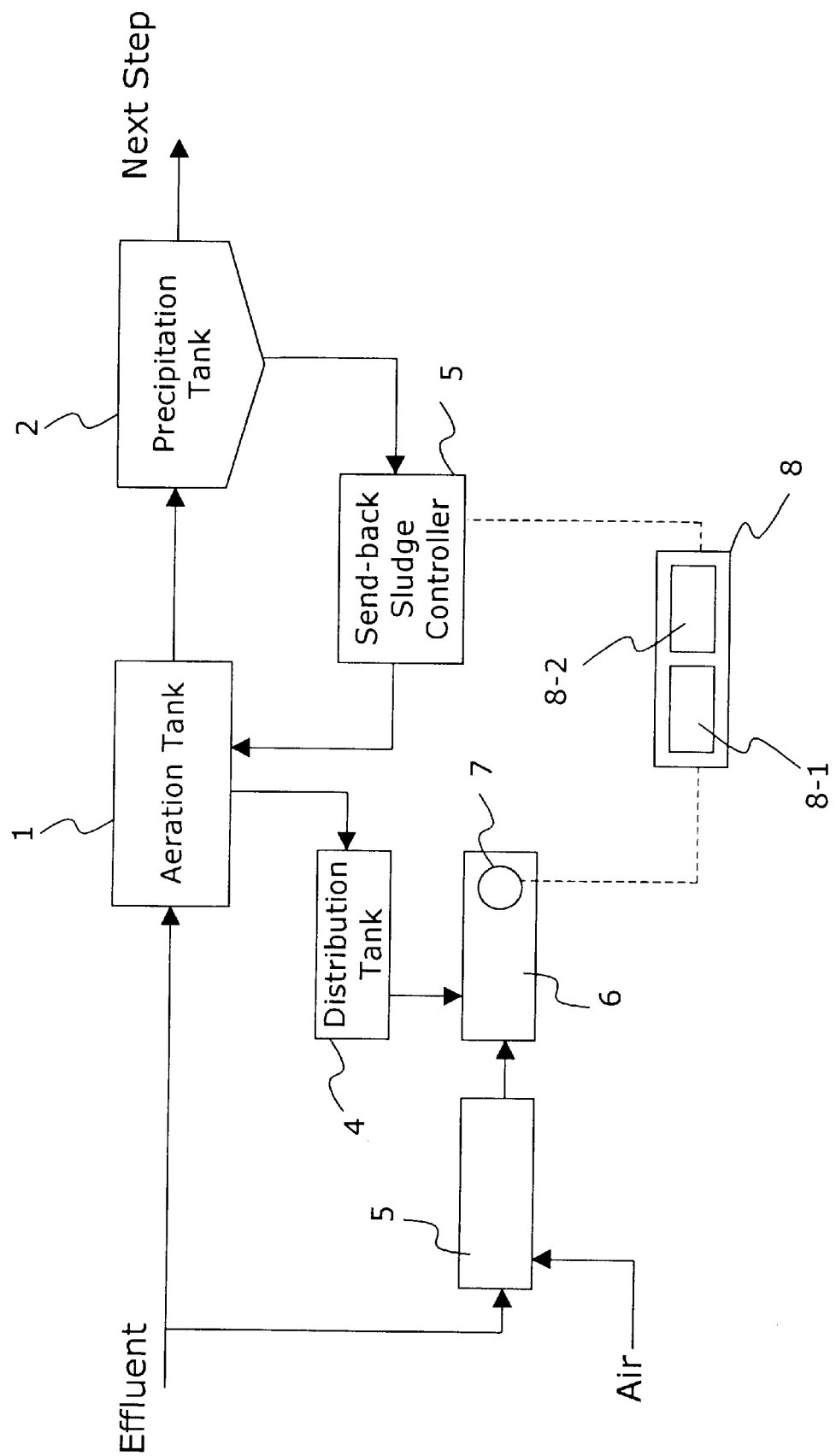
FIG. 1 is a schematic drawing showing the constitution of one embodiment of the effluent processing apparatus of the present invention.

The feature of the present invention is described with reference to FIG. 1.

A part of effluent is extracted and introduced into a dissolved oxygen saturation tank 5, then saturated with oxygen by aeration, and transferred into a dissolved oxygen measurement tank 6. A part of the activated sludge in an aeration tank 1 is extracted and transferred into the dissolved oxygen measurement tank 6 via a distribution tank 4. A dissolved oxygen sensor 7 is provided in the dissolved oxygen measurement tank 6, and the change with time of dissolved oxygen concentration in the tank 6 is measured at a dissolved oxygen measurement section 8-1. From this dissolved oxygen consumption pattern is determined an organic matter concentration in effluent; from this organic matter concentration in effluent is determined an amount of activated sludge to be returned, at a section 8-2 for determination of to-be-returned activated sludge amount; based on this amount is controlled an amount of activated sludge to be returned, at a send-back sludge controller 3, and the amount is returned to the aeration tank 1. Thereby, it becomes possible to maintain the activated sludge amount in aeration tank 1 so as to match the organic matter concentration in effluent, and stable processing of effluent becomes possible regardless of the fluctuation of organic matter load in effluent.

In the present invention, the aeration tank 1 and the precipitation tank 2 can each be a conventional tank.

The distribution tank 4 is for transferring a part of the activated sludge extracted from the aeration tank 1, into the dissolved oxygen measurement tank 6. In the tank 4, it is desirable that the activated sludge and water extracted from the aeration tank 1 are subjected to solid-liquid separation. In order to extract a given amount of the activated sludge, first the concentration of activated sludge in the sludge-water mixture extracted is measured by spectrophotometry (e.g. absorbency or transmittance) or by microscopy and subsequent image processing and then the amount of the sludge-water mixture to be extracted is determined. For extraction, a metering tank is provided upstream of the distribution tank 4, or a pump of timer control type is used. The solid-liquid separation in distribution tank 4 can be conducted by a known method such as filtration and centrifugation.

The present invention is specifically described below by way of Examples. However, the present invention is in no way restricted to these Examples.

EXAMPLE 1

The present Example is described with reference to FIG. 1. The activated sludge processing apparatus shown in FIG. 1 comprises a dissolved oxygen saturation tank 5, a dissolved oxygen measurement tank 6, a dissolved oxygen sensor 7, a distribution tank 4, a unit 8 for determination of to-be-returned activated sludge amount, a send-back sludge controller 3, an aeration tank 1 and a precipitation tank 2. The unit 8 for determination of to-be-returned activated sludge amount comprises a dissolved oxygen measurement section 8-1 and a section 8-2 for determination of to-be-returned activated sludge amount.

The dissolved oxygen saturation tank 5 has an aeration function and can saturate part of the effluent extracted thereinto, with oxygen.

The distribution tank 4 has a function of transferring a given amount of the activated sludge extracted from the aeration tank 1, into the dissolved oxygen measurement tank 6.

The dissolved oxygen measurement tank 6 has a function of gently stirring (1) the dissolved oxygen-saturated effluent sent from the dissolved oxygen saturation tank 5 and (2) the activated sludge sent from the distribution tank 4, in an environment shielded from the atmosphere.

The dissolved oxygen sensor 7 is provided in the dissolved oxygen measurement tank 6 and is connected to the dissolved oxygen measurement section 8-1 which measures the dissolved oxygen present in the tank 6.

The dissolved oxygen measurement section 8-1 measures the dissolved oxygen concentration of the mixed solution in the dissolved oxygen measurement tank 6, and outputs the measurement result to the section 8-2 for determination of to-be-returned activated sludge amount.

In the section 8-2 for determination of to-be-returned activated sludge amount is beforehand inputted the dissolved oxygen consumption pattern of a standard sludge at various organic matter concentrations; the dissolved oxygen consumption pattern of a to-be-processed effluent is compared with the beforehand inputted dissolved oxygen consumption pattern, derived from the change with time of dissolved oxygen concentration inputted from the dissolved oxygen measurement section 8-1; thereby, the organic matter concentration in the effluent flowing into the aeration tank 1 at the moment of measurement is determined; as a result, a to-be-returned activated sludge amount is determined so as to match the above organic matter concentration in the effluent.

The send-back sludge controller 3 controls, based on the above-determined to-be-returned activated sludge amount, the activated sludge amount to be returned from the precipitation tank 2 to the aeration tank 1. The method of control may be any as long as it can transfer a required amount of the activated sludge into the aeration tank 1, and the method can be, for example, control of flow amount of to-be-returned activated sludge or control of time intervals of extracting activated sludge from the precipitation tank 2.

Next, the operation of the apparatus of FIG. 1 is described in detail.

A part of effluent to be processed is allowed to flow into the dissolved oxygen saturation tank 5. Since the effluent discharged from production processes do not contain a sufficient amount of dissolved oxygen in many cases, the effluent is subjected to aeration in the tank 5 to obtain dissolved oxygen-saturated effluent. This dissolved oxygen-saturated effluent is transferred into the dissolved oxygen measurement tank 6.

Meanwhile, a part of the mixture (activated sludge and effluent) in the aeration tank 1 is extracted and measured for transmittance by spectroscopy. This transmittance is compared with the transmittances at various sludge concentrations obtained beforehand, to determine the sludge concentration in the aeration tank 1. From the thus-determined sludge concentration is determined the amount of mixture to be extracted from tank 1. The activated sludge and effluent extracted from the aeration tank 1 is subjected to solid-liquid separation in the distribution tank 4. When the solid-liquid separation is conducted using a membrane, the activated sludge remaining on the membrane is back-washed with a given amount of water and transferred into the dissolved oxygen measurement tank 6 together with the back-washing water used. When the solid-liquid separation is conducted by centrifugation, the supernatant liquid is discarded and the precipitate is transferred into the dissolved oxygen measurement tank 6 by using a given amount of water. In this case, the back-washing water is preferably the dissolved oxygen-saturated effluent obtained in the dissolved oxygen saturation tank 5. In the dissolved oxygen measurement tank 6, the activated sludge transferred from the tank 4 is adjusted to a desired concentration using the dissolved oxygen-saturated effluent sent from the dissolved oxygen saturation tank 5 and the back-washing water.

The dissolved oxygen measurement tank 6 is shielded from the atmosphere so that no external oxygen comes thereinto. In the tank 6, the dissolved oxygen-saturated effluent and the activated sludge are stirred and mixed mildly, whereby the activated sludge decomposes the organic matter present in the effluent aerobically and the oxygen dissolved in the effluent is consumed. In general, therefore, the oxygen dissolved in effluent is consumed faster when the organic matter concentration in effluent is higher. In the dissolved oxygen measurement tank 6 is provided a dissolved oxygen sensor 7 connected to the dissolved oxygen measurement section 8-1; the dissolved oxygen measurement section 8-1 monitors the change with time of the dissolved oxygen in the mixture of the dissolved oxygen-saturated effluent and the activated sludge; the result of the monitoring is inputted to the section 8-2 for determination of to-be-returned activated sludge amount. In the section 8-2 is beforehand inputted the dissolved oxygen consumption or rate of a standard sludge at various organic matter concentrations; this pattern or rate is compared with the dissolved oxygen consumption rate or pattern of a to-be-processed effluent, derived from the change with time of dissolved oxygen inputted from the dissolved oxygen measurement section 8-1; the comparison indicates an amount by which the activated sludge in aeration tank 1 is short for decomposing the organic matter in effluent flowing at the moment of measurement; from this information is determined the amount of activated sludge to be returned.

Figure 4:
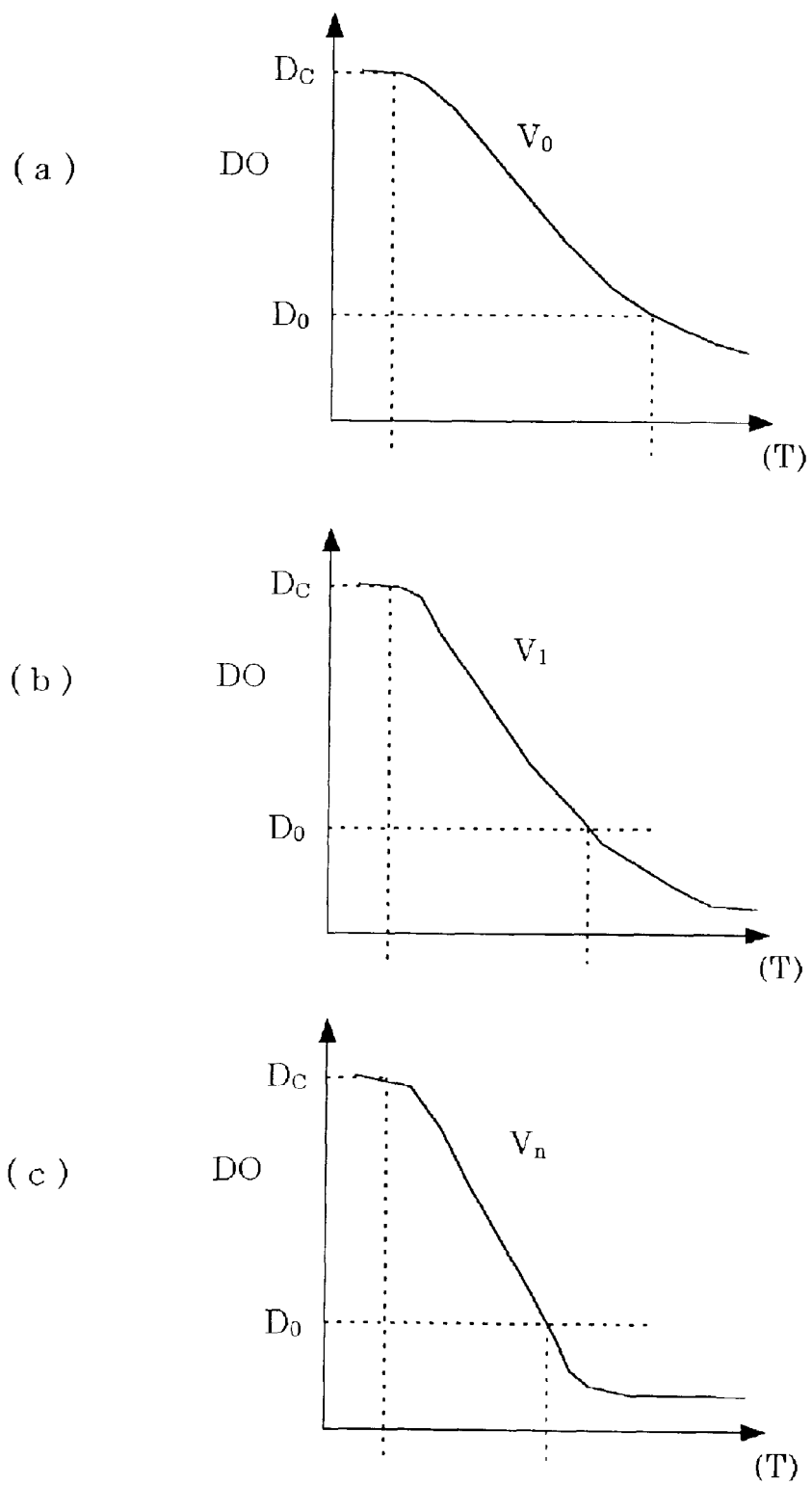
FIGS. 4(a) to 4(c) are graphs showing the changes of dissolved oxygen consumption rate at various organic matter concentrations.
Figure 5:
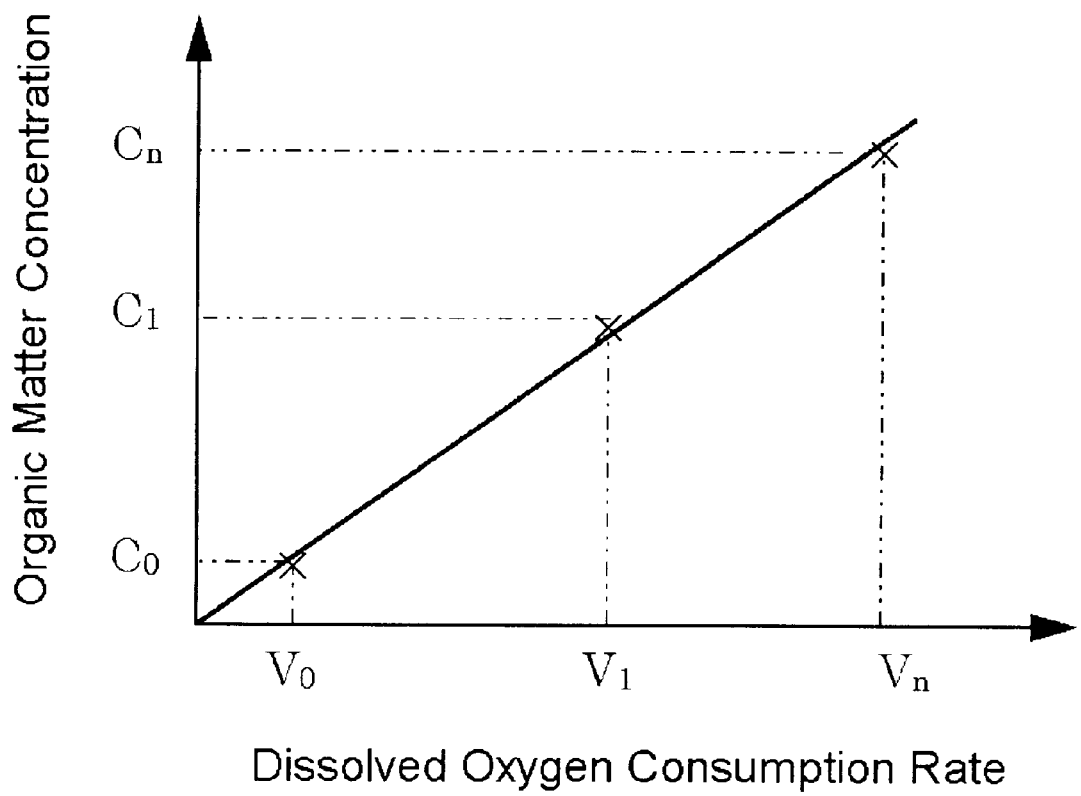
FIG. 5 is a graph showing a relation between organic matter concentration and dissolved oxygen consumption rate.

In order to determine the to-be-returned activated sludge amount from the change of the dissolved oxygen, it is convenient to beforehand examine the dissolved oxygen consumption pattern of a given amount of a standard sludge in the presence of an easily decomposable organic matter and determine the dissolved oxygen consumption rate in the oxygen range where the organic matter is stably decomposed. The range at which the concentration of the to-be-decomposed organic matter varies, is taken as $C_o$ to $C_n$, and a relation between dissolved oxygen consumption rate and organic matter concentration is determined for each organic matter concentration level. When the organic matter concentration is low, the dissolved oxygen consumption rate is small; when the concentration is high, the rate is large. That is, as shown in FIGS. 4(*a*) to 4(*c*), a time in which the dissolved oxygen concentration (DO) decreases from a saturation state $(D_c)$ to a certain concentration $(D_o)$, is measured for each organic matter concentration {in FIGS. 4(*a*) to 4(*c*), $C_o$ in 4(*a*); $C_I$ in 4(*b*); and $C_n$ in 4(*c*)}, and each dissolved oxygen consumption rate is determined. The thus-obtained dissolved oxygen consumption rates are plotted against organic matter concentrations, whereby an approximate expression very close to a linear expression is obtained as shown in FIG. 5.

That is, when the dissolved oxygen consumption rate has increased based on the change with time of dissolved oxygen monitored in the dissolved oxygen measurement tank 6, the unit 8 for determination of to-be-returned activated sludge amount judges that the organic matter in effluent has increased, and determines a to-be-returned activated sludge amount so as to match the increase. The to-be-returned activated sludge amount is determined by calculating an activated sludge amount necessary for processing of organic matter within its residence time in aeration tank, or is determined empirically, and is controlled so that the sludge concentration in aeration tank determined by spectroscopy as mentioned previously becomes appropriate for processing of the organic matter in effluent.

Control in controller 3, of the activated sludge amount to be returned from the precipitation tank 2 to the aeration tank 1 is conducted so as to match the organic matter concentration in effluent. Thus, processing of effluent is conducted stably even when the organic matter load in effluent fluctuates.

There is no particular restriction as to the time intervals of measurement of organic matter concentration. This measurement may be conducted at time interval optimum for the size of the processing system employed.

Control of the to-be-returned activated sludge amount may be made by change of valve opening degree or of extraction pump revolution. When the frequency of extracting activated sludge from precipitation tank is changed by the use of a timer, control of the to-be-returned activated sludge amount may be made by change of on-off frequency of timer.

EXAMPLE 2

Figure 2:
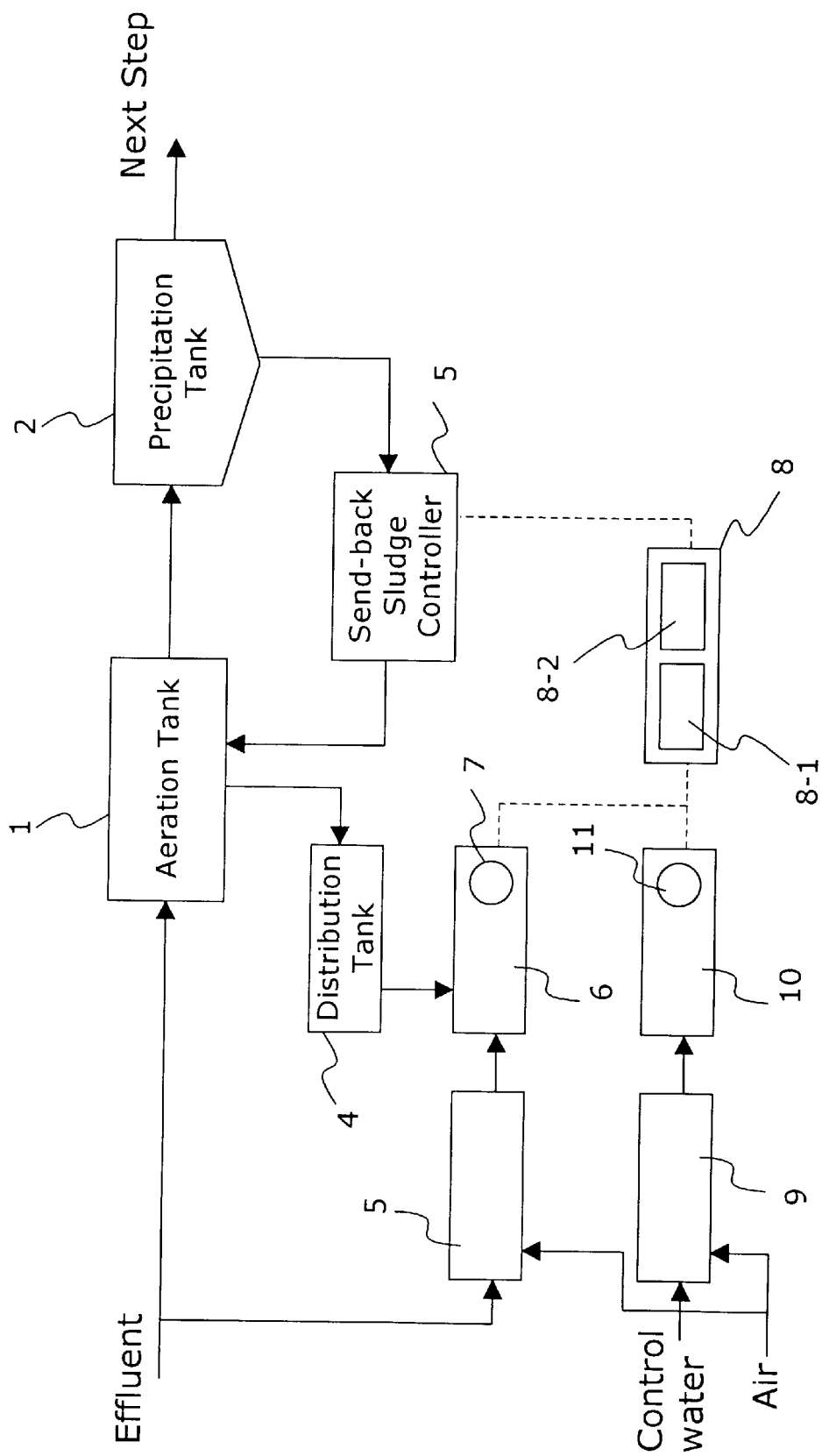
FIG. 2 is a schematic drawing showing the constitution of other embodiment of the effluent processing apparatus of the present invention.

Other Example of the present invention is described with reference to FIG. 2. A control water, which is a water of low organic matter concentration, such as city water, is introduced into a dissolved oxygen saturation tank 9 for control, then saturated with oxygen by aeration, and transferred into a dissolved oxygen measurement tank 10 for control. A given amount of an activated sludge is extracted from an aeration tank 1 and transferred into the tank 10 via a distribution tank 4. The change with time of dissolved oxygen of the solution in the tank 10 is measured at a dissolved oxygen measurement section 8-1. The dissolved oxygen consumption pattern or rate derived from this measurement is subtracted as a blank value from the dissolved oxygen consumption pattern or rate obtained for effluent to be processed, whereby the dissolved oxygen consumption patter or rate for the true organic matter present in the effluent is measured. This enables exact determination of required activated sludge amount and makes it possible to determine the to-be-returned activated sludge amount corresponding to the reduction in the decomposition activity of activated sludge in aeration tank 1.

EXAMPLE 3

In the above Examples, no consideration was made on the activity of activated sludge. In this Example, the activity of activated sludge is considered in determination of to-be-returned activated sludge amount. The activity of activated sludge in aeration tank can be examined, for example, as follows. In FIG. 2, a water of given organic matter concentration is used as the control water; the water is beforehand measured for dissolved oxygen consumption pattern by using a standard sludge; the water is then measured for dissolved oxygen consumption pattern by using the activated sludge extracted from the aeration tank 1; the two dissolved oxygen consumption patterns are compared; thereby, the activity of activated sludge in aeration tank can be determined. By inputting the thus-determined activity of activated sludge in aeration tank, into the result of Example 1 or 2, the to-be-returned activated sludge amount can be determined more exactly. Therefore, when the activity of activated sludge in aeration tank has been found to be, for example, lower than that of the standard sludge, the to-be-returned activated sludge amount is corrected to a higher side.

Since the activity of activated sludge does not fluctuate very sharply, it is sufficient that the above determination of the activity of activated sludge is conducted every time when the operation of Example 1 or 2 has been repeated several to several tens of times. When the organic matter concentration in effluent has increased to a very high level, the activity of activated sludge may soon drop; when there is such a drop in activity, it is judged that a sharp increase in organic matter concentration has taken place in the effluent, and the above determination of sludge activity can be effectively conducted after the operation in which an increase in the to-be-returned activated sludge amount has exceeded a predetermined level.

The activity of activated sludge can be determined also by other method which comprises extracting the enzyme in activated sludge and measuring its enzymatic activity to a predetermined matter. However, this method requires labor and time. Therefore, the determination method used in the present Example is highly meritorious.

EXAMPLE 4

Figure 3:
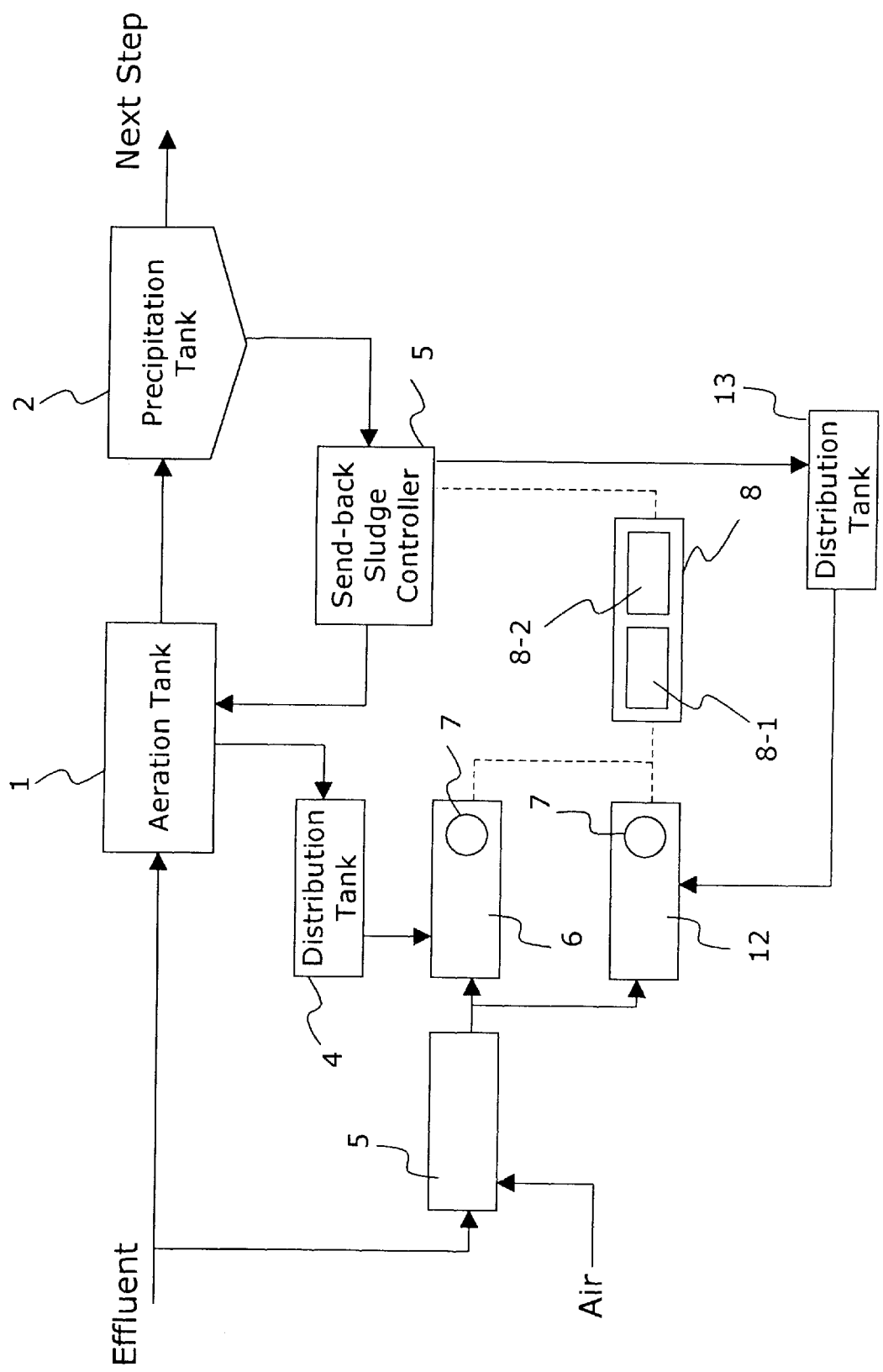
FIG. 3 is a schematic drawing showing the constitution of still other embodiment of the effluent processing apparatus of the present invention.

A more preferred embodiment of the present invention is shown in FIG. 3. In FIG. 3, part of the to-be-returned activated sludge is extracted into a distribution tank 13; it is mixed with a dissolved oxygen-saturated effluent in a dissolved oxygen measurement tank 12 and measured for dissolved oxygen consumption pattern or rate in the same manner as in the above Examples; the measurement result is inputted to the dissolved oxygen consumption pattern or rate by the activated sludge in an aeration tank 1, measured in the same manner as in the above Examples; thereby an optimum to-be-returned activated sludge amount is determined. When the to-be-returned activated sludge has a high activity, its dissolved oxygen consumption rate for effluent of certain organic matter concentration is slightly larger than that of a standard sludge for the same effluent; therefore, the to-be-returned activated sludge amount can be set at a slightly lower level. Conversely, when the to-be-returned activated sludge has a low activity, the to-be-returned activated sludge amount can be set at a slightly higher level.

What is claimed is:

1. A method for controlling, in an activated-sludge processing apparatus comprising at least an aeration tank and a precipitation tank, the amount of the activated sludge to be returned from the precipitation tank to the aeration tank, which method comprises:

a step of extracting a part of effluent to be processed in the aeration tank and aerating the extracted effluent to saturate it with oxygen to prepare a dissolved oxygen-saturated effluent, a step of extracting a part of activated sludge directly from the aeration tank and mixing the extracted activated sludge with the dissolved oxygen-saturated effluent to prepare a mixture, a step of measuring the change of the dissolved oxygen concentration in the mixture, a step of determining, from the change, the dissolved oxygen consumption pattern or rate of the activated sludge instantly present in aeration tank, comparing the pattern or rate with the predetermined dissolved oxygen consumption pattern of a standard sludge at various organic matter concentrations to determine an organic matter concentration in the effluent to be processed, and determining, based on the organic matter concentration, an amount of activated sludge to be returned, and a step of returning, based on the amount, part of the activated sludge in the precipitation tank to the aeration tank.

2. A method for control of the amount of activated sludge to be returned, according to claim 1, which method comprises:

a step of aerating a control water of low organic matter concentration to saturate it with oxygen to prepare a dissolved oxygen-saturated control water, mixing the dissolved oxygen-saturated control water with a part of the activated sludge in aeration tank, to prepare a mixture, and measuring the change of the dissolved oxygen concentration in the mixture, a step of subtracting this change from the change of the dissolved oxygen concentration in the mixture of the dissolved oxygen-saturated effluent and part of the activated sludge in aeration tank, a step of determining, from the remainder of subtraction, the dissolved oxygen consumption pattern of the activated sludge in aeration tank, comparing the pattern with the predetermined dissolved oxygen consumption pattern of a standard sludge at various organic matter concentrations to determine an organic matter concentration in the effluent to be processed, and determining, based on the organic matter concentration, an amount of activated sludge to be returned, and a step of returning, based on the amount, part of the activated sludge in the precipitation tank to the aeration tank.

3. A method for control of the amount of activated sludge to be returned, according to claim 1, which method comprises:

a step of aerating a control water of given organic matter concentration to saturate it with oxygen to prepare a dissolved oxygen-saturated control water, mixing the dissolved oxygen-saturated control water with a part of the activated sludge in aeration tank, to prepare a mixture, and measuring the mixture for dissolved oxygen consumption pattern, a step of comparing this dissolved oxygen consumption pattern with the predetermined dissolved oxygen consumption pattern of a standard sludge at various organic matter concentrations, to determine the activity of the activated sludge in aeration tank, and a step of using this activity as an input for determination of the amount of activated sludge to be returned, to determine the optimum amount of activated sludge to be returned.

4. A method for control of the amount of activated sludge to be returned, according to claim 1, wherein a part of the activated sludge to be returned is extracted and mixed with the dissolved oxygen-saturated effluent to prepare a mixture, the mixture is measured for change of dissolved oxygen, and the result of the measurement is used as an input for determination of the amount of activated sludge to be returned, to determine the optimum amount of activated sludge to be returned.

5. A method for control of the amount of activated sludge to be returned, according to claim 1, wherein the dissolved oxygen consumption pattern is a dissolved oxygen consumption rate.

6. A method for control of the amount of activated sludge to be returned, according to claim 1, wherein in preparing a mixture of a part of the activated sludge in aeration tank and the dissolved oxygen-saturated effluent, the activated sludge and water extracted from the aeration tank are subjected to solid-liquid separation and the resulting solid is mixed with the dissolved oxygen-saturated effluent.

7. A method for control of the amount of activated sludge to be returned, according to claim 1, wherein the amount of activated sludge to be returned is determined so that the measured activated sludge concentration in aeration tank becomes optimum for processing of the organic matter present in the effluent.

8. An activated-sludge processing apparatus comprising:

an aeration tank, a precipitation tank, a means for extracting a part of effluent to be processed in the aeration tank and aerating the extracted effluent to saturate it with oxygen to prepare a dissolved oxygen-saturated effluent, a means for extracting a part of the activated sludge directly from the aeration tank, a means for mixing the extracted activated sludge with the dissolved oxygen-saturated effluent to prepare a mixture, a means for measuring the change of the dissolved oxygen concentration in the mixture, a means for determining, from the change, the dissolved oxygen consumption pattern of the mixture, comparing the pattern with the predetermined dissolved oxygen consumption pattern of a standard sludge at various organic matter concentrations to determine an organic matter concentration of the effluent to be processed, and determining, based on the organic matter concentration, an amount of activated sludge to be returned, and a means for returning, based on the amount, part of the activated sludge in the precipitation tank to the aeration tank.

9. An activated-sludge processing apparatus according to claim 8, further comprising:

a means for aerating a control water of low organic matter concentration to prepare a dissolved oxygen-saturated control water, a means for mixing the dissolved oxygen-saturated control water with a part of the activated sludge in aeration tank, extracted in the same manner as mentioned in claim 8, to prepare a control mixture, and a means for measuring the change of the dissolved oxygen concentration in the control mixture, wherein the above change is subtracted from the change of the dissolved oxygen concentration in the mixture of the dissolved oxygen-saturated effluent and a part of the activated sludge in aeration tank; from the remainder of subtraction is determined the dissolved oxygen consumption pattern of the activated sludge in aeration tank; the pattern is compared with the predetermined dissolved oxygen consumption pattern of a standard sludge at various organic matter concentrations to determine the organic matter concentration in the effluent to be processed; and based on this organic matter concentration is determined an amount of activated sludge to be returned.

10. An activated-sludge processing apparatus according to claim 8, further comprising:

a means for aerating a control water of given organic matter concentration to saturate it with oxygen to prepare a dissolved oxygen-saturated control water, mixing the dissolved oxygen-saturated control water with a part of the activated sludge in aeration tank, to prepare a mixture, and measuring the mixture for dissolved oxygen consumption pattern, and a means for comparing this dissolved oxygen consumption pattern with the predetermined dissolved oxygen consumption pattern of a standard sludge at various organic matter concentrations, to determine the activity of the activated sludge in aeration tank, wherein this activity is used as an input for determination of the amount of activated sludge to be returned, to determine the optimum amount of activated sludge to be returned.

11. An activated-sludge processing apparatus according to claim 8, further comprising:

a means for extracting a part of the activated sludge to be returned and mixing it with the dissolved oxygen-saturated effluent to prepare a mixture, and a means for measuring the mixture for change of dissolved oxygen, wherein the result of the measurement is used as an input for determination of the amount of activated sludge to be returned, to determine the optimum amount of activated sludge to be returned.

12. An activated-sludge processing apparatus according to claim 8, wherein the dissolved oxygen consumption pattern is dissolved oxygen consumption rate.

13. An activated-sludge processing apparatus according to claim 8, wherein in the means for extracting a part of the activated sludge present in the aeration tank, the activated sludge and water extracted from the aeration tank can be subjected to solid-liquid separation.

14. An activated-sludge processing apparatus according to claim 8, further comprising a means for measuring the concentration of activated sludge in aeration tank.

15. An activated-sludge processing apparatus comprising:
   an aeration tank,
   a precipitation tank,
   a saturation tank connected to a source of effluent for extracting a part of the effluent to be processed in the aeration tank and aerating the extracted effluent to saturate it with oxygen to prepare a dissolved oxygen-saturated effluent,
   a distribution tank connected to the aeration tank for extracting a part of the activated sludge present in the aeration tank,
   a measurement tank connected to the saturation tank and the distribution tank for mixing the extracted activated sludge with the dissolved oxygen-saturated effluent to prepare a mixture,
   a measurement sensor in communication with the measurement tank for measuring the change of the dissolved oxygen concentration in the mixture,
   a determination unit in communication with the measurement sensor for determining, from the change, the dissolved oxygen consumption pattern of the mixture, comparing the pattern with the predetermined dissolved oxygen consumption pattern of a standard sludge at various organic matter concentrations to determine an organic matter concentration of the effluent to be processed, and determining, based on the organic matter concentration, an amount of activated sludge to be returned, and
   a controller for returning, based on the amount, part of the activated sludge in the precipitation tank to the aeration tank.

\* \* \* \* \*